United States Patent [19]

Wu

[11] Patent Number: 5,404,630
[45] Date of Patent: Apr. 11, 1995

[54] METHOD OF JOINING A FRAME TUBE TO A LUG

[76] Inventor: Yung-Yuan Wu, No. 8, Lane 65, Hsiang Shang Rd., Hu Tong Li, Hsi Hu Chen, Chang Hua Hsien, Taiwan, Prov. of China

[21] Appl. No.: 240,145

[22] Filed: May 10, 1994

Related U.S. Application Data

[63] Continuation-in-part of Ser. No. 7,892, Jan. 22, 1993, abandoned.

[51] Int. Cl.⁶ .................... B29C 65/52; B29C 65/56; B29C 65/72
[52] U.S. Cl. ...................... 29/423; 29/469.5; 29/521; 29/523; 156/91; 156/165; 156/294; 280/281.1; 403/277; 403/278; 403/282
[58] Field of Search ............. 156/165, 221, 294, 91; 29/423, 469.5, 505, 522.1, 523, 521; 280/279, 280, 281.1; 403/277, 278, 279, 282; 285/382.5, 382.7

[56] References Cited

U.S. PATENT DOCUMENTS

| | | | |
|---|---|---|---|
| 604,863 | 5/1898 | Hoyer | 285/382.5 |
| 3,210,102 | 10/1965 | Joslin | 29/523 |
| 3,432,916 | 3/1969 | Fisher et al. | 29/521 |
| 4,479,662 | 10/1984 | Defour et al. | 280/281.1 |
| 4,583,755 | 4/1986 | Diekman et al. | 280/281.1 |
| 5,039,470 | 8/1991 | Bezin et al. | 280/279 |

FOREIGN PATENT DOCUMENTS

| | | | |
|---|---|---|---|
| 9089 | of 1897 | United Kingdom | 403/277 |
| 23046 | of 1897 | United Kingdom | 403/278 |
| 6317 | of 1898 | United Kingdom | 403/277 |
| 7695 | of 1899 | United Kingdom | 29/523 |
| 847470 | 10/1939 | United Kingdom | 403/278 |

*Primary Examiner*—Steven D. Maki
*Attorney, Agent, or Firm*—Bacon & Thomas

[57] ABSTRACT

A method of joining a frame tube to a lug, including steps of making through holes on the lug, squeezing a first elastomer to deform the frame tube causing a plurality of outward projections raised from the frame tube and engaging the through holes, then inserting a reinforcing tube into the frame tube after removal of the first elastomer and then squeezing a second elastomer to deform the reinforcing tube causing a plurality of outward projections raised from the reinforcing tube to engage the inside wall of the frame tube.

1 Claim, 7 Drawing Sheets

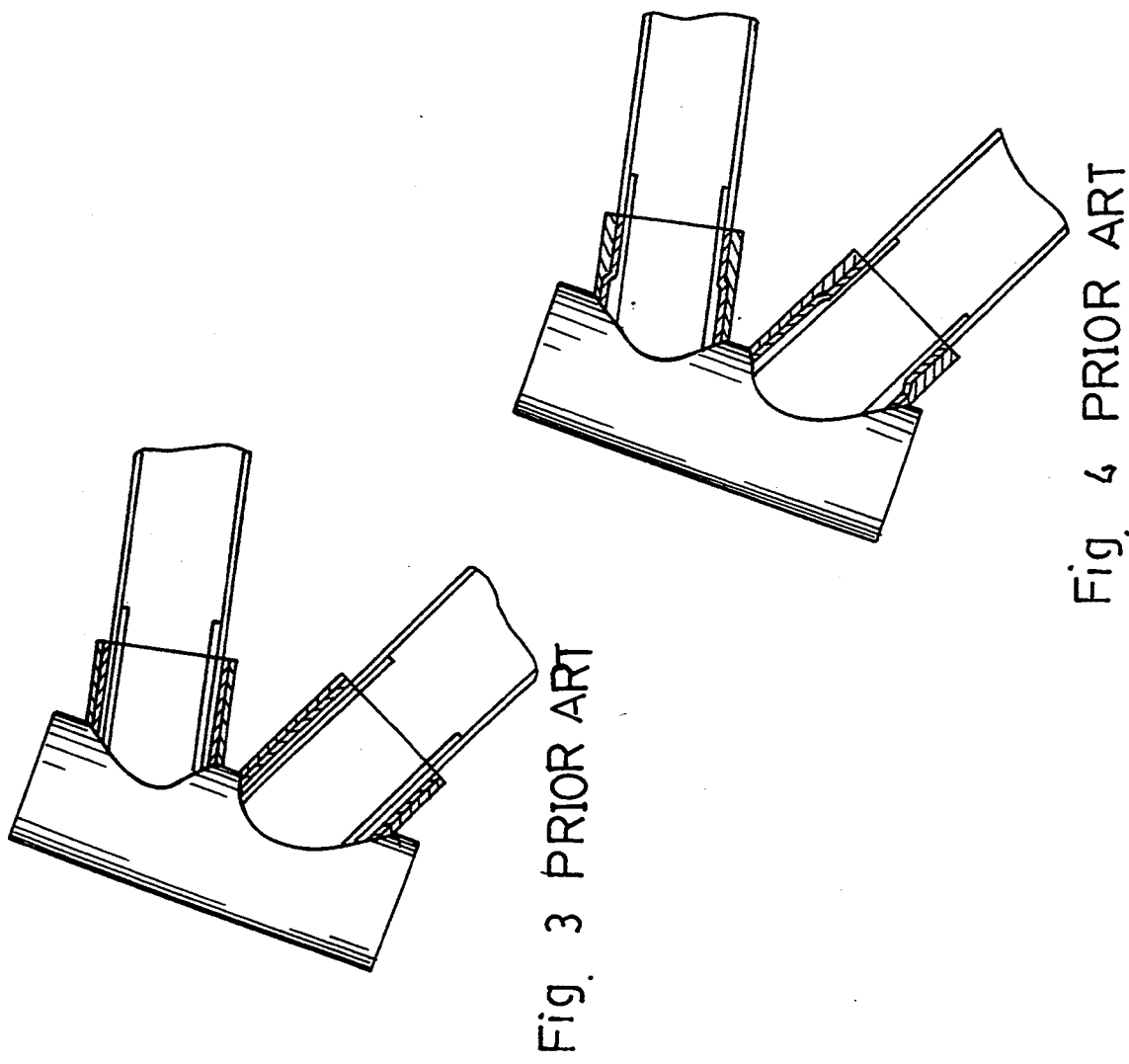
Fig. 3 PRIOR ART
Fig. 4 PRIOR ART
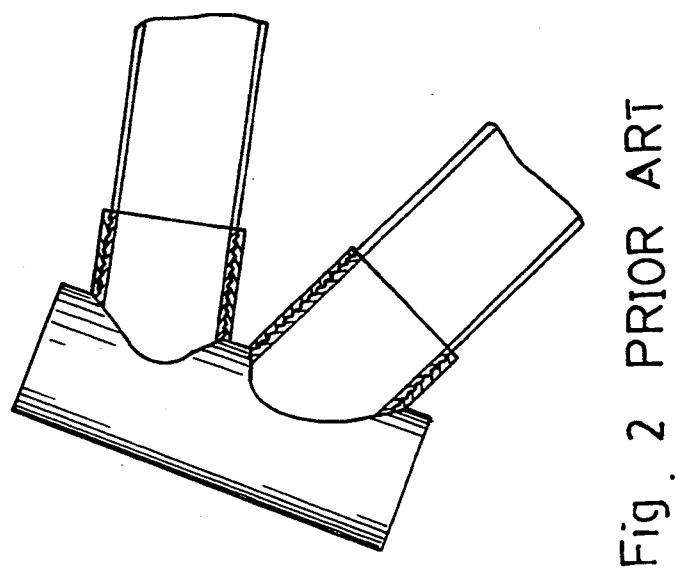
Fig. 2 PRIOR ART

METHOD OF JOINING A FRAME TUBE TO A LUG

CROSS-REFERENCE TO RELATED APPLICATION

The present invention is a continuation-in-part of patent application Ser. No. 8/007,892, filed on Jan. 22, 1993, now abandoned.

BACKGROUND OF THE INVENTION

The frame of a bicycle, as shown in FIG. 1, is generally comprised of a top tube, a town tube, a seat tube and two seat stays respectively connected by a front frame tube connector, a rear frame tube connector and a bottom frame tube connector. When assembled, the top, down and seat tubes and the seat stays are respectively welded to the frame tube connectors to ensure the connections. This welding process applicable only when the tubes and seat stays of the frame and the frame tube connectors are all made from iron. In recent years, titanium and aluminum alloys have been intensively used for making bicycle frames and frame tube connectors. Because welding one bicycle frame tube of titanium alloy to another or to a frame tube connector of titanium alloy will damage the structural strength of the bicycle frame, welding process is not applicable in this case. Therefore, screw joints or adhesive devices may be used instead of welding process. FIG. 2 illustrates two frame tubes fastened to two lugs on a frame tube connector by screw joints according to the prior art. However, because one frame tube connector may receive two frame tubes, it is not easy to connect several frame tubes to a plurality of frame tube connectors by screw joints. FIG. 3 shows a frame tube connecting method which connects a frame tube to a lug on a frame tube connector by an adhesive device. According to this connecting method, the inside surface of the lug and the outside surface of the frame tube are respectively coated with a layer of bonding resin. After the coating of the bonding resin, the frame tube is inserted into the lug and becomes firmly retained in place as the bonding resin is hardened. However, the bonding resin may brittle easily after long uses, thereby causing the connection to become loosened.

FIG. 4 shows another frame tube connecting method which is to make an inside step on the inside surface of the lug and an outside step on the outside surface of the frame tube, and then to insert the frame tube into the lug permitting the steps to be engaged with each other. This method is critical in precision, therefore an expensive precision apparatus must be used for making the steps. If the steps are not precisely made at respective locations, the connection of the lug and the frame tube will be unstable. Therefore, this method cannot eliminate the problem of a high defective rate. If the frame tubes of a bicycle frame are not firmly connected together, the bicycle will be broken easily when it is moving over an uneven road at a high speed.

SUMMARY OF THE INVENTION

The present invention has been accomplished under the aforesaid circumstances. According to the present invention, the method of joining a frame tube to a lug, including steps of making through holes on the lug, squeezing a first elastomer to deform the frame tube causing a plurality of outward projections raised from the frame tube and engaging the through holes, then inserting a reinforcing tube into the frame tube after the removable of the first elastomer and then squeezing a second elastomer to deform the reinforcing tube causing a plurality of outward projections raised from the reinforcing tube and engaging the inside wall of the frame tube. According to another aspect of the present invention, a bonding resin is coated over the inside wall of the lug before the insertion of the frame tube so that the frame tube is retainably connected to the lug when it is inserted into the lug and the bonding resin is hardened. The method of the present invention greatly improves the bond of connection between the lug and the frame tube without affecting their structural strength.

BRIEF DESCRIPTION OF THE DRAWINGS

FIG. 2 shows two frame tubes fastened to two lugs on a frame tube connector by screw joints according to the prior art;

FIG. 3 illustrates two frame tubes fastened to two lugs on a frame tube connector by a bonding resin according to the prior art;

FIG. 4 illustrates the outside step on each frame tube respectively engaged with the inside step on a respective lug of a frame tube connector according to the prior art;

DETAILED DESCRIPTION OF THE PREFERRED EMBODIMENT

Figure 1:
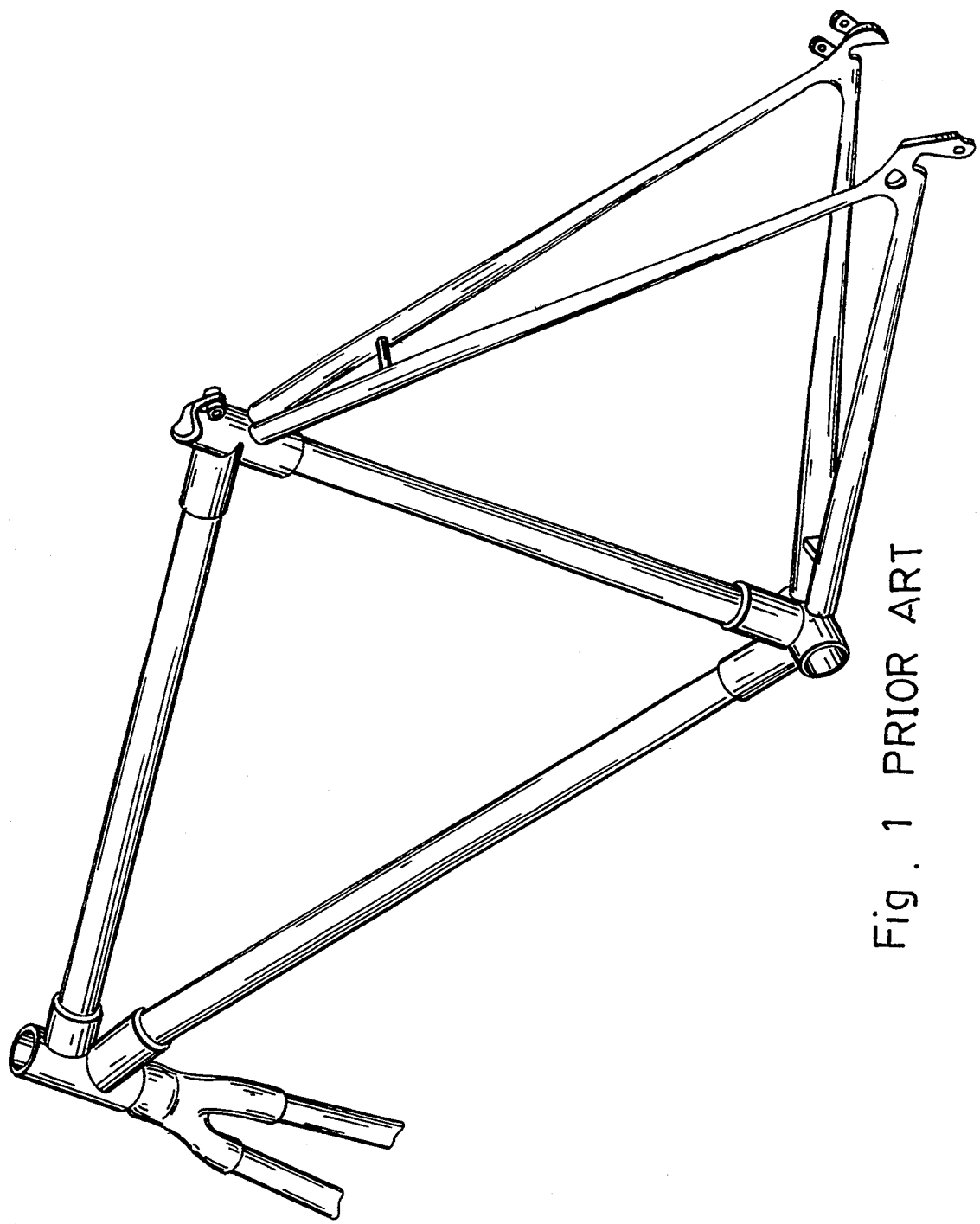
FIG. 1 is an elevational view of a regular bicycle frame assembly.
Figure 5A:
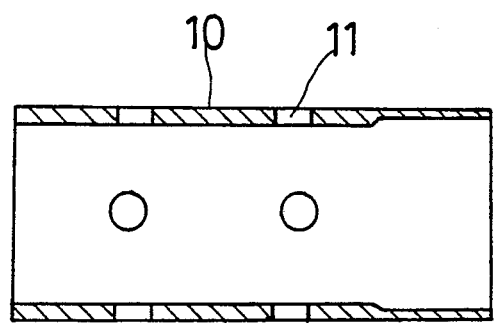
FIG. 5A illustrates an initial step in the joining method of the present invention.
Figure 5B:
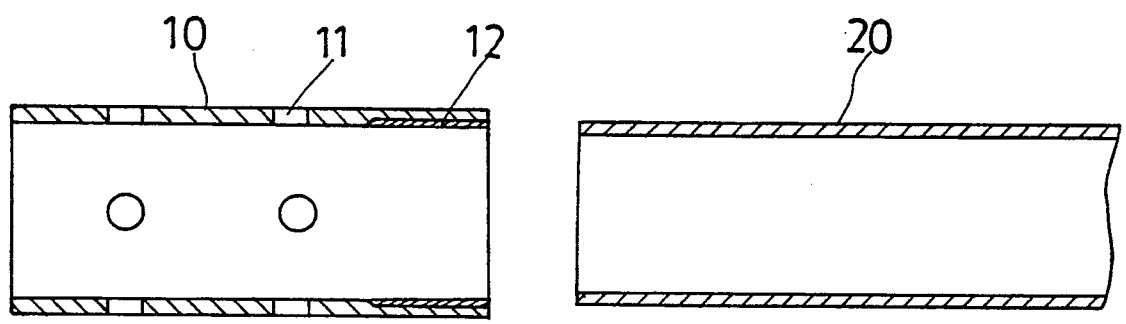
FIG. 5B illustrates a secondary step in the joining method of the present invention.
Figure 5C:
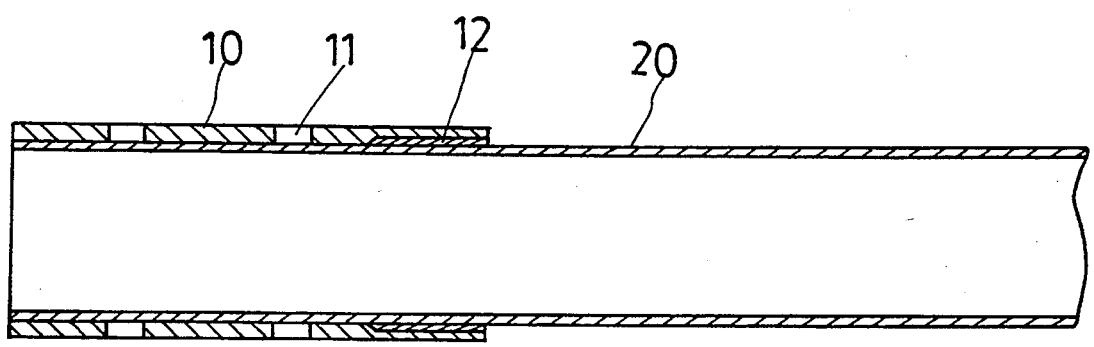
FIG. 5C illustrates a third step in the joining method of the present invention.
Figure 5D:
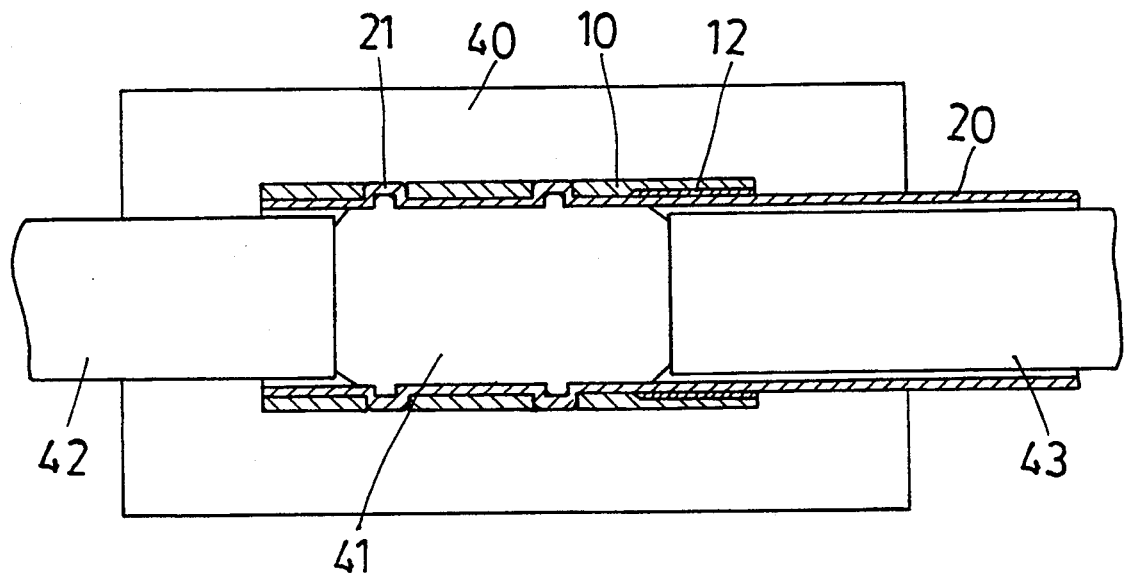
FIG. 5D illustrates a fourth step in the joining method of the present invention.
Figure 5E:
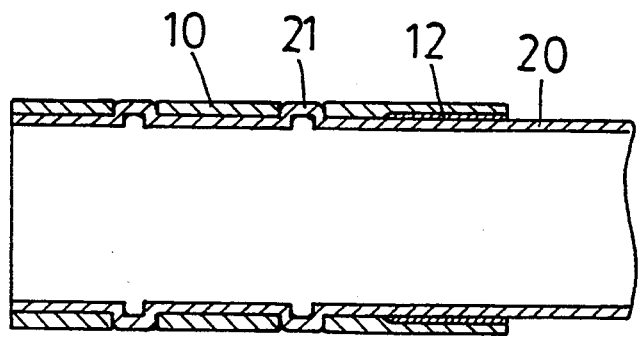
FIG. 5E illustrates a fifth step in the joining method of the present invention.
Figure 5F:
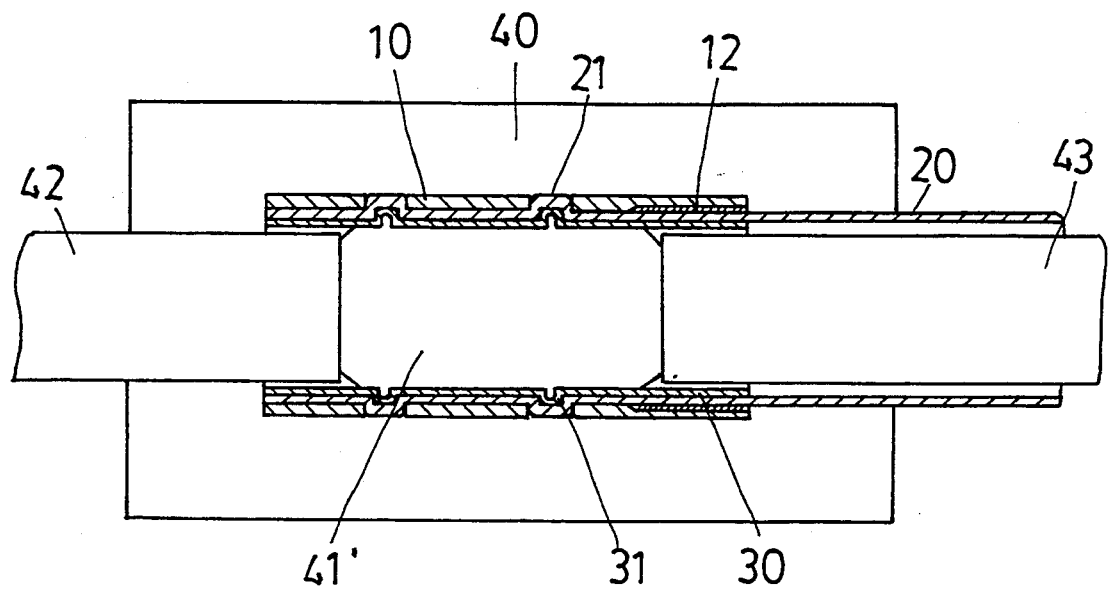
FIG. 5F illustrates a sixth step in the joining method of the present invention.
Figure 5G:
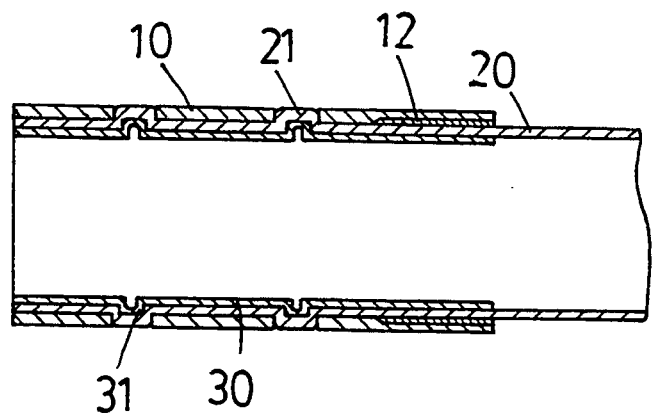
FIG. 5G illustrates the joint made by the joining method of the present invention.

Referring to FIGS. 5A through 5G, the method of joining a frame tube to a lug according to the present invention includes steps of:
a) making a plurality of through holes (of any desired shape) 11 on the lug 10 (see FIG. 5A);
b) coating the inside wall of the lug 10 with a layer of bonding resin 12 and then inserting the frame tube 20 into the lug 10 (see FIGS. 5B and 5C);
c) putting the connected lug 10 and frame tube 20 in between the upper and lower dies of a mold 40, then inserting an elastomer element 41 into the frame tube 20, then driving two plungers 42;43 by a hydraulic apparatus to squeeze the elastomer element from two opposite ends, causing the wall of the frame tube 20 squeezed to form a plurality of outward projections 21, which engage the through holes 11 on the lug 10 (see FIGS. 5D and 5E), and then removing the elastomer element 41 from the frame tube 20;

d) inserting an elastomer element 41' in a reinforcing tube 30 then placing the reinforcing tube 30 into the connected lug and frame tube thus obtained from step c), and then placing the connected reinforcing tube, lug and frame tube in the mold 40 again permitting the elastomer element 41' to be squeezed to deform by the plungers 42;43 that the reinforcing tube 30 is forced to form a plurality of outward projections 31 respectively engaging the inside wall of the frame tube 20 at locations corresponding to the through holes 11 on the lug 10 (see FIGS. 5F and 5G).

Figure 6:
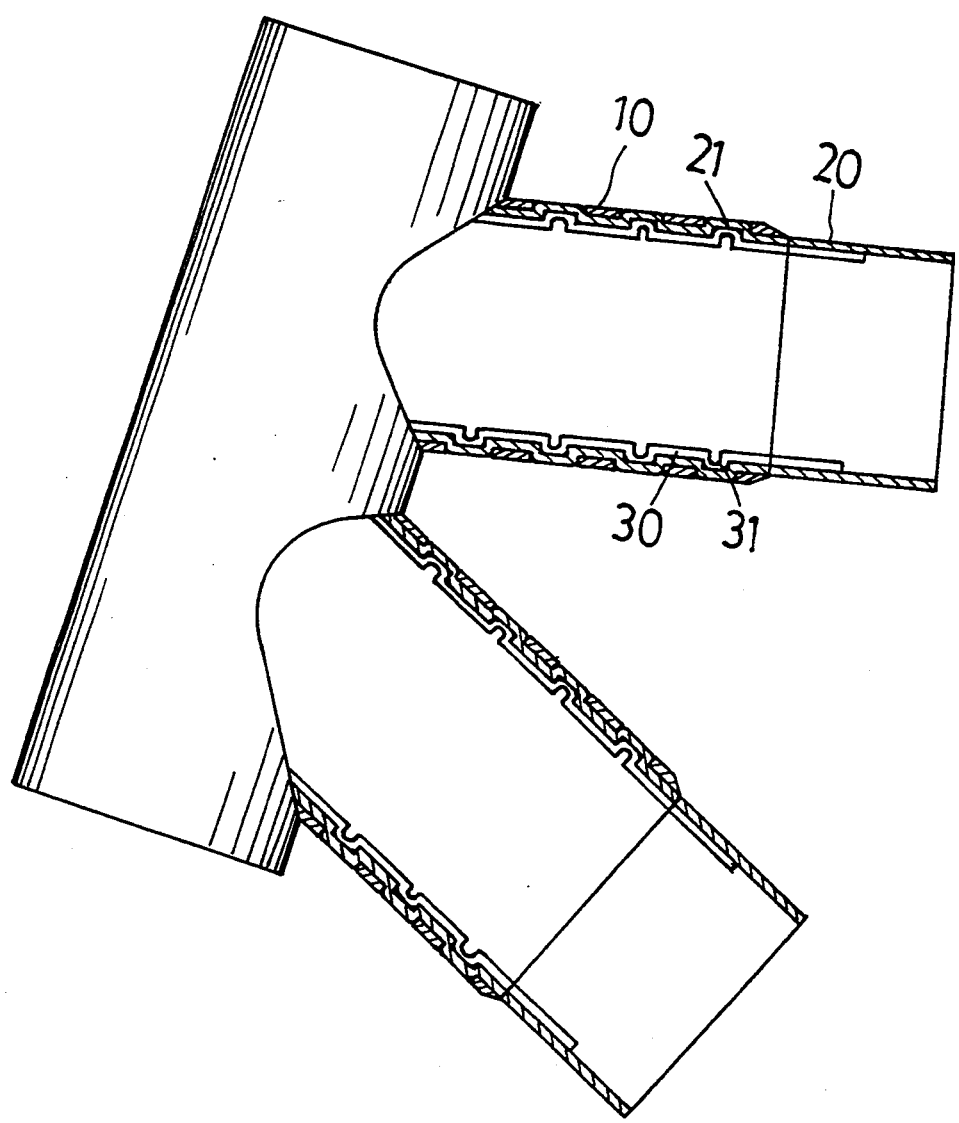
FIG. 6 is a sectional view showing two frame tubes fastened to the two lugs of a bicycle frame tube connector according to the present invention.
Figure 7:
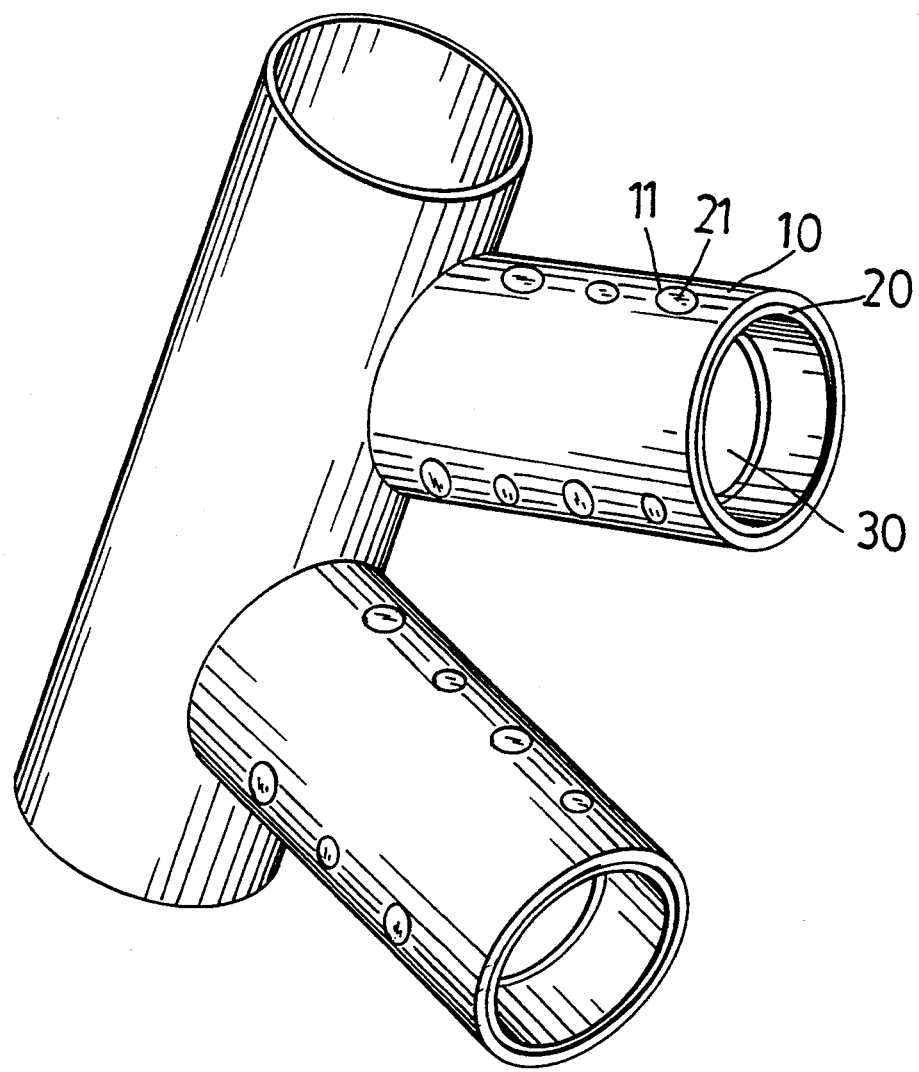
FIG. 7 is a perspective view of the bicycle frame tube connection depicted in FIG. 6.

Referring to FIGS. 6 and 7, after the processing described above, the frame tube 20 is adhered to the lug 10 on the inside and retained between the lug 10 and the reinforcing tube 30, the outward projections 31 of the reinforcing tube 30 engage the inside wall of the frame tube 20 and the outward projections 21 of the frame tube 20 engage the through holes 11 on the lug 10, and therefore the reinforcing tube 30, the frame tube 20 and the lug 10 are tightly joined together with one inside another. Because the lug 10 is covered inside the mold 40 during processing process, the outward projections 21 of the frame tube 20 are disposed flush with the outside surface of the lug 10 after the processing is finished.

I claim:

1. A method of joining a frame tube to a lug having an inside wall, comprising the steps of:
    a) making a plurality of through holes in said lug;
    b) coating the inside wall of said lug with a layer of bonding resin and then inserting said frame tube into said lug;
    c) putting the lug and frame tube in between upper and lower dies of a mold, then inserting a first elastomer element into said frame tube, then driving two plungers by a hydraulic apparatus to squeeze said first elastomer element from two opposite ends to cause the wall of said frame tube to form a plurality of outward projections, which engage the through holes in said lug so that the lug and frame tube are connected, and then removing said first elastomer element from said frame tube;
    d) inserting a second elastomer element in a reinforcing tube, then placing said reinforcing tube, with the second elastomer element therein, into the connected lug and frame tube thus obtained from step c) to form an assembly of the reinforcing tube, with the second elastomer element therein, and the connected lug and frame tube, and then placing the assembly in said mold and squeezing said second elastomer element with said plungers so that said reinforcing tube is forced to form a plurality of outward projections respectively engaging the inside wall of said frame tube at locations corresponding to the through holes on said lug.

* * * * *